Figure 1:
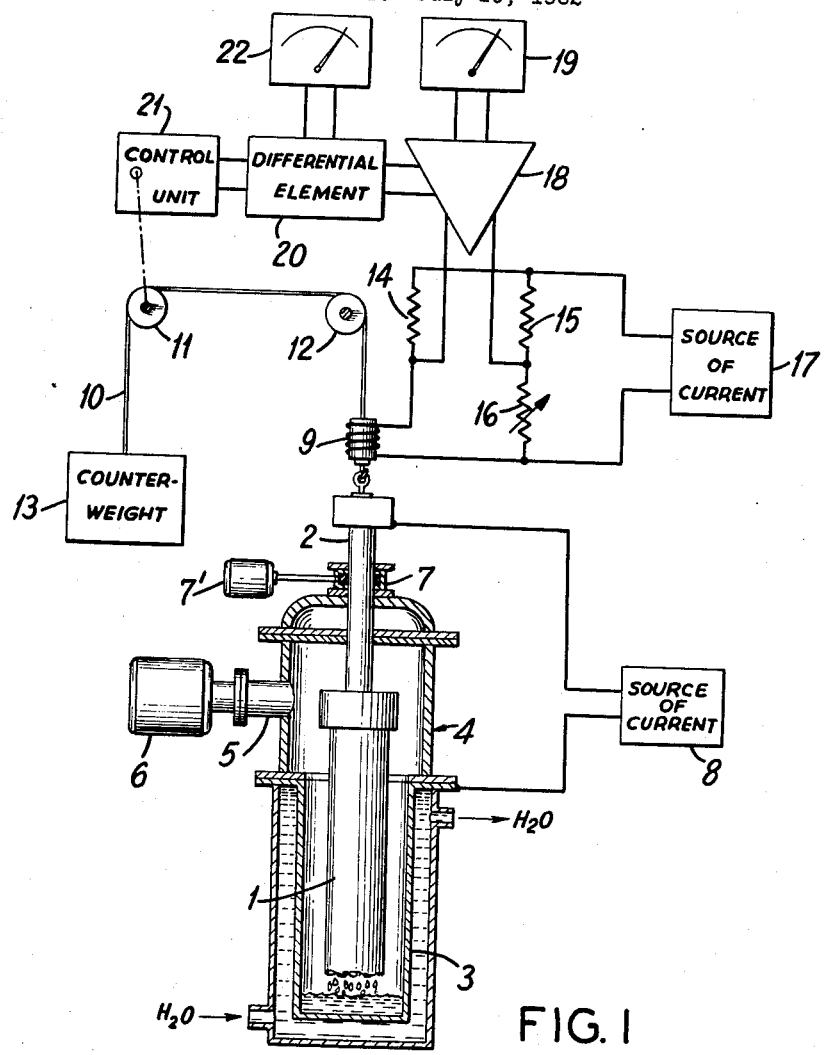

April 20, 1965     KARL-GEORG REDEL ETAL     3,179,734
CONTROL MECHANISM FOR MELTING FURNACE
Filed July 10, 1962

INVENTORS,
KARL-GEORG REDEL
KLAUS SAMIETZ
BY
Kleinand Bellon
ATTORNEYS

United States Patent Office 3,179,734
Patented Apr. 20, 1965

3,179,734
CONTROL MECHANISM FOR MELTING FURNACE
Karl-Georg Redel, Bruchköbel, Kreis Hanau am Main, and Klaus Samietz, Gelnhausen, Germany, assignors to W. C. Heraeus G.m.b.H., Hanau am Main, Germany, a firm of Germany
Filed July 10, 1962, Ser. No. 208,773
Claims priority, application Germany, July 13, 1961, H 43,117
9 Claims. (Cl. 13—12)

The present invention relates to a control mechanism for supervising the operation of a melting furnace, and especially one of the vacuum type, for example, a vacuum arc furnace, in which one or more consumable electrodes are melted into a crucible which is preferably cooled.

In the operation of melting furnaces employing consumable electrodes, and especially in vacuum melting furnaces in which the consumable electrodes were melted into a cooled crucible by means of an electric arc, by inductive heating, or by an electron bombardment it has heretofore not been possible to ascertain the weight of the consumable electrode during the melting process and to control the melting speed in accordance with the changing weight.

Although it is known that the melting speed of a consumable electrode in a vacuum arc furnace may be determined from its speed of descent by means of a position indicator and that this speed may be controlled accordingly, this method has the disadvantage that it is impossible to determine accurately whether or not the consumable electrode is melted off completely and that it is also very difficult to ascertain the exact instant when the hot-topping operation must be started. Furthermore, if the cross-sectional size of the consumable electrodes is not uniform or if they contain shrink holes, this known method can be applied only with very great difficulties.

It is an object of the present invention to overcome the above-mentioned disadvantages in the operation of a melting furnace, and especially one of the vacuum type, in which at least one consumable electrode is melted off into a preferably cooled crucible by means of an electric arc, by inductive heating, or by an electron bombardment. For attaining this object, the invention provides that at a part of the melting furnace which as the result of the weight of the consumable electrode is subjected either to tension or pressure at least one resilient element is installed, the electrical resistance of which varies in proportion to its deformation which is caused by the exertion thereon of such a tension or pressure, and that such an element or such elements are connected to a source of current to form an electric circuit into which at least one indicating instrument or control mechanism is connected. The resilient element which may be of any suitable type known as such may therefore be one, the electrical resistance of which is responsive either to expansion or compression. If several elements of the mentioned type are provided, they may be either of the same kind or of different kinds and be connected either in series or parallel to each other. If the element is one, the electrical resistance of which is responsive to its expansion, it may be interposed, for example, between the suspension cable of the consumable electrode and the electrode itself, in which case the weight of the consumable electrode may be directly indicated by an instrument or, if the consumable electrode is secured to a supporting rod, the weight of the latter must be either deducted from the result as indicated or the instrument may be set or calibrated so that the weight of the supporting rod will be automatically deduced or compensated so that the indication of the instrument will be that solely of the weight of the consumable electrode. If the resilient element to be employed should be one which is responsive to expansion, it may, for example, be of the type as used as a strain gauge. Such strain gauge elements are especially suitable for determining the weight of consumable electrodes up to about 40 tons. If the consumable electrodes have a greater weight, it is often more advisable to employ one or more elements, the electrical resistance of which is responsive to their compression. These elements may, for example, be mounted underneath the bearing or bearings which support the suspension cable of the consumable electrode or its supporting rod. For purposes of comparison, it is also possible to employ simultaneously elements of the mentioned kinds which have opposite resistance characteristics.

The above-mentioned as well as additional features and advantages of the present invention will becomes more clearly apparent from the following detailed description which is to be read with reference to the accompanying drawings, in which—

Figure 2:
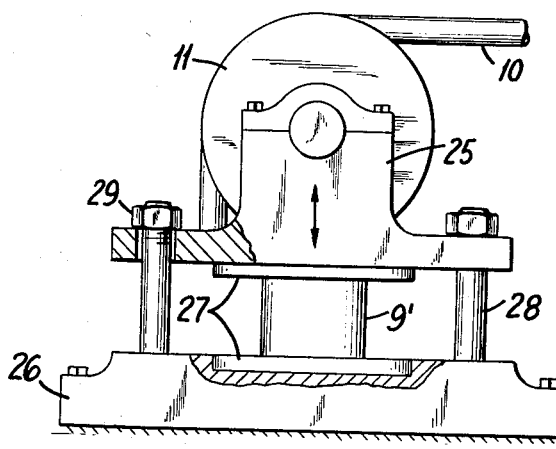

FIGURE 1 shows diagrammatically and partly in cross section a vacuum arc furnace which is provided with an electric indicating and/or control system including a resilient element, the electrical resistance of which is responsive to its expansion; while FIGURE 2 shows a side view, partly in cross section of a bearing block either for the driving pulley or the idler pulley carrying the suspension cable for the consumable electrode or its supporting rod, which is provided with a resilient element, the electrical resistance of which is responsive to its compression.

In the drawings, FIGURE 1 illustrates diagrammatically a vacuum arc melting furnace which contains a consumable electrode 1 which is secured to an electrode supporting rod 2 and is melted off into a cooled crucible 3 which is connected vacuum-tight to the furnace chamber 4. The furnace chamber 4 is connected by a pipe 5 to a vacuum pump unit 6. The electrode supporting rod 2 extends into the furnace chamber 4 through at least one pressure stage 7 which is connected to a vacuum pump unit 7'. The crucible 3 and the electrode supporting rod 2 are connected to a source of current 8 which supplies the current for melting the consumable electrode 1. An electric resistance element 9, the electrical resistance of which is responsive to its expansion which is caused by the combined weight of the consumable electrode and its supporting rod 2 is secured at its lower side to the upper end of the supporting rod and at its upper side to a suspension cable 10 which extends over a driving pulley 11 and an idler pulley 12 and the other end of which is secured to a counterweight 13. According to the particular embodiment of the invention as illustrated in FIGURE 1, the resistance element 9 is connected into an arm of a Wheatstone bridge. If two or more resistance elements are employed, each element is separately connected to an arm of the Wheatstone bridge which contains at least one variable resistor in another arm. The bridge is formed of the resistors 14, 15, and 16, at least one of which, for example, the resistor 16, is variable, and of the resistance element 9 and the source of current 17. The bridge is connected to an amplifier 18 which, in turn, is connected to an indicator 19, a differential element 20 such as the "rate and width generator" as designated RWG in the advertisement of General Applied Science Laboratories, Inc. appearing on page 130 of the "Electronics Buyer's Guide" of July 25, 1962, published by McGraw Hill Corporation, 330 West 42nd Street, New York 36, New York, and a control unit 21 for controlling the melting speed of the consumable electrode 1, and comprising a servo positioning torque motor such as that of Inland Motor Corporation of Virginia, type T-36001, as described on page 417 of the aforementioned publication. The differential element 20 is connected to a further indicator 22 which in the particular embodiment as shown registers the change in weight of the consumable electrode 1 during the melting process within a certain time unit, while the indicator 19 registers the weight of the consumable electrode 1 at any time during the melting process. The amplifier 18 may in some cases be omitted so that the differential element 20, the indicator 19, and the control unit 21 will be directly connected to the bridge. Of course, additional indicators, for example, signaling apparatus, may also be connected to the amplifier, preferably through an electronic switch mechanism. These signaling apparatus may, for example, be of the kind which give a signal, for example, a light signal in the event that the consumable electrode is in direct connection with the crucible or the melted material therein, or when the consumable electrode is melted off completely or to such an extent that the hot topping operation should be started.

FIGURE 2 illustrates a modification of the apparatus according to FIGURE 1, in which the resilient electric resistance element 9' is one, the electrical resistance of which is responsive to its compression. Instead of being connected directly to the electrode supporting rod and its suspension cable, as shown in FIGURE 1, this resistance element 9' may be acted upon by one of the pulleys which support the suspension cable 10, for example, by being mounted between the bearing block 25 and its stationary support 26 and by being insulated therefrom by insulating members 27. The bearing block 25 is slidable substantially without friction relative to its support 26 on guide rods 28, the effective length of which may be adjustable, for example, by means of nuts 29. The opposite ends of the resilient resistance element 9' as shown in FIGURE 2 may be connected to the Wheatstone bridge in the same manner as the resistance element 9 according to FIGURE 1.

As previously pointed out, it is also within the concept of the invention to connect to the Wheatstone bridge either several resistance elements which are subjected to expansion or to compression so that the cumulative expansion or compression of these elements is proportionate to the weight of the respective consumable electrode. It is also possible to provide both types of elements within the same system either for purposes of comparison of the indicated results or in order to permit the same indicating or control system to be used for consumable electrodes of greatly different weight ranges.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In a melting furnace having a furnace chamber, a crucible in said chamber, a consumable electrode at least partly within said chamber, heating means for progressively melting off the lower end of said consumable electrode into said crucible, and means for feeding said consumable electrode in the direction toward said crucible, at least one element having an electrical resistance varying in proportion to its deformation, means for connecting said element to said feeding means so as to be acted upon by the weight of said consumable electrode and to be deformed thereby, and electric circuit means connected to said element and including a source of current and electric means for determining the electrical resistance of said element and the changes in said resistance due to the varying deformation of said element caused by the changing weight of said consumable electrode while being melted.

2. In a melting furnace having a furnace chamber, a crucible in said chamber, a consumable electrode at least partly within said chamber, heating means for progressively melting off the lower end of said consumable electrode into said crucible, and means for suspending said consumable electrode and for feeding the same in the direction toward said crucible, said suspension and feeding means comprising a suspension cable connected at one end to said consumable electrode, and means for raising and lowering said cable end, at least one resilient element having an electrical resistance varying in proportion to its expansion and contraction, said element being interposed between said suspension cable and said consumable electrode so as to be acted upon by the weight of said consumable electrode and to be expanded thereby, said element being adapted to be contracted by its own resilience when the weight of said consumable electrode decreases, and electric circuit means connected to said element and including a source of current and electric means for determining the electric resistance of said element and the changes in said resistance due to the varying deformation of said element caused by the changing weight of said consumable electrode while being melted.

3. In a melting furnace having a furnace chamber, a crucible in said chamber, a consumable electrode at least partly within said chamber, heating means for progressively melting off the lower end of said consumable electrode into said crucible, and means for suspending said consumable electrode and for feeding the same in the direction toward said crucible, said suspension and feeding means comprising a suspension cable connected at one end to said consumable electrode, and means for raising and lowering said cable end comprising pulley means and bearing means for said pulley means, said bearing means comprising a stationary support having guide means thereon, and a bearing member mounted on said guide means so as to be slidable relative to said stationary support for rotatably mounting said pulley means, at least one resilient element having an electrical resistance varying in proportion to its compression and expansion, said element being interposed between said stationary support and said bearing member so as to be compressed by the latter by the weight of said consumable electrode transmitted by said suspension cable to said pulley means, said element being adapted to expand by its own resilience when the weight of said consumable electrode decreases, and electric circuit means connected to said element and including a source of current and electric means for determining the electric resistance of said element and the changes in said resistance due to the varying deformation of said element caused by the changing weight of said consumable electrode while being melted.

4. In a melting furnace having a furnace chamber, a crucible in said chamber, a consumable electrode at least partly within said chamber, heating means for progressively melting off the lower end of said consumable electrode into said crucible, and means for suspending said consumable electrode and for feeding the same in the direction toward said crucible, a plurality of elements each having an electrical resistance varying in proportion to its deformation, means for connecting said elements to said suspension and feeding means at different points thereof so as to be acted upon by the weight of said consumable electrode and to be deformed thereby, and electric circuit means connected to said elements and including a source of current and electric means for determining the electrical resistance of said elements and the changes in said resistance due to the varying deformation of said elements caused by the changing weight of said consumable electrode while being melted.

5. In a melting furnace having a furnace chamber, a crucible in said chamber, a consumable electrode at least partly within said chamber, heating means for progressively melting off the lower end of said consumable electrode into said crucible, and means for suspending said consumable electrode and for feeding the same in the direction toward said crucible, a plurality of elements each having an electrical resistance varying in proportion to its deformation, means for connecting said elements to said suspension and feeding means at different points thereof so as to be acted upon by the weight of said consumable electrode and to be deformed thereby, and electric circuit means connected to said elements and including a source of current and electric means for determining the electrical resistance of each of said elements and the changes in said resistance due to the varying deformation of each of said elements caused by the changing weight of said consumable electrode while being melted.

6. In a melting furnace having a furnace chamber, a crucible in said chamber, a consumable electrode at least partly within said chamber, heating means for progressively melting off the lower end of said consumable electrode into said crucible, and means for suspending said consumable electrode and for feeding the same in the direction toward said crucible, a plurality of elements each having an electrical resistance in proportion to its deformation, at least two of said elements having opposite resistance characteristics, means for connecting said elements to said suspension and feeding means at different points thereof so as to be acted upon by the weight of said consumable electrode and to be deformed thereby, and electric circuit means connected to said elements and including a source of current and electric means for determining the electrical resistance of said elements and the changes in said resistance due to the varying deformation of said elements caused by the changing weight of said consumable electrode while being melted.

7. In a melting furnace having a furnace chamber, a crucible in said chamber, a consumable electrode at least partly within said chamber, heating means for progressively melting off the lower end of said consumable electrode into said crucible, and means for feeding said consumable eletrode in the direction toward said crucible, at least one element having an electrical resistance varying in proportion to its deformation, means for connecting said element to said feeding means so as to be acted upon by the weight of said consumable electrode and to be deformed thereby, and electric circuit means comprising a bridge circuit, said element being connected to said bridge circuit so as to form one arm thereof, at least one variable resistor in another arm of said bridge circuit, a source of current connected to said bridge circuit, and means for indicating the electrical resistance of said element and the changes in said resistance due to the varying deformation of said element caused by the changing weight of said consumable electrode while being melted.

8. In a melting furnace having a furnace chamber, a crucible in said chamber, a consumable electrode at least partly within said chamber, heating means for progressively melting off the lower end of said consumable electrode into said crucible, and means for suspending said consumable electrode and for feeding the same in the direction toward said crucible, a plurality of elements each having an electrical resistance varying in proportion to its deformation, means for connecting said elements to said suspension and feeding means at different points thereof so as to be acted upon by the weight of said consumable electrode and to be deformed thereby, and electric circuit means comprising a bridge circuit, each of said elements being separately connected to an arm of said bridge circuit, at least one variable resistor in a further arm of said bridge circuit, and means for indicating the electrical resistance of said elements and the changes in said resistance due to the varying deformation of said elements caused by the changing weight of said consumable electrode while being melted.

9. In a melting furnace having a furnace chamber, a crucible in said chamber, a consumable electrode at least partly within said chamber, heating means for progressively melting off the lower end of said consumable electrode into said crucible, and means for feeding said consumable electrode in the direction toward said crucible, at least one element having an electrical resistance varying in proportion to its deformation, means for connecting said element to said feeding means so as to be acted upon by the weight of said consumable electrode and to be deformed thereby, and electric circuit means comprising a bridge circuit, said element being connected to said bridge circuit so as to form one arm thereof, at least one variable resistor in another arm of said bridge circuit, a source of current connected to said bridge circuit, amplifying means connected to said bridge circuit, and electric control means connected to said amplifying means and comprising means for controlling the speed at which said consumable electrode is melted in accordance with the resistance of said element and the changes in said resistance due to the varying deformation of said element caused by the changing weight of said consumable electrode while being melted.

References Cited by the Examiner
UNITED STATES PATENTS

| | | | |
|---|---|---|---|
| 2,798,107 | 7/57 | Boron et al. | 13—13 |
| 2,846,645 | 8/58 | Ruge | 324—62 X |
| 3,004,152 | 10/61 | Dyche | 324—62 X |

RICHARD M. WOOD, *Primary Examiner.*

JOSEPH V. TRUHE, *Examiner.*